US009337453B2

(12) United States Patent
Ogura et al.

(10) Patent No.: US 9,337,453 B2
(45) Date of Patent: May 10, 2016

(54) BATTERY PACK FOR USE WITH HAND-HELD ELECTRIC POWER TOOL

(71) Applicant: MAKITA CORPORATION, Anjo-Shi (JP)

(72) Inventors: Hironori Ogura, Anjo (JP); Akira Naito, Anjo (JP); Takuya Umemura, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 198 days.

(21) Appl. No.: 14/369,706

(22) PCT Filed: Dec. 25, 2012

(86) PCT No.: PCT/JP2012/008287
§ 371 (c)(1),
(2) Date: Jun. 29, 2014

(87) PCT Pub. No.: WO2013/099227
PCT Pub. Date: Jul. 4, 2013

(65) Prior Publication Data
US 2014/0349143 A1    Nov. 27, 2014

Related U.S. Application Data

(60) Provisional application No. 61/581,957, filed on Dec. 30, 2011.

(51) Int. Cl.
| H01M 2/10 | (2006.01) |
| H01M 2/08 | (2006.01) |
| H01M 10/42 | (2006.01) |
| H01M 10/6235 | (2014.01) |
| H01M 10/6556 | (2014.01) |

(52) U.S. Cl.
CPC .............. *H01M 2/1055* (2013.01); *H01M 2/08* (2013.01); *H01M 2/105* (2013.01);
(Continued)

(58) Field of Classification Search
CPC ............ H01M 10/613; H01M 2/1077; H01M 10/643; H01M 2/105; H01M 2/1055; H01M 2/08
See application file for complete search history.

(56) References Cited

U.S. PATENT DOCUMENTS 6,498,406 B1    12/2002  Hoeriuchi et al.
6,537,694 B1 *  3/2003  Sugiura ............... H01M 2/1022
                                                        429/120
(Continued)

FOREIGN PATENT DOCUMENTS

EP    1030388 A    8/2000
JP    2006156171 A    6/2006
(Continued)

OTHER PUBLICATIONS

International Search Report from PCT/JP2012/008287.
(Continued)

*Primary Examiner* — Stewart Fraser
(74) *Attorney, Agent, or Firm* — J-Tek Law PLLC; Jeffrey D. Tekanic; Scott T. Wakeman

(57) ABSTRACT

A battery pack (10; 110) for a power tool includes a housing (18) made of a rigid material. The housing contains a cooling air passage (54), which is in gaseous communication with the outside environment, and at least one isolated space (52). At least one isolating wall (44) is disposed inside the housing so as to physically separate and isolate the cooling air passage from the at least one isolated space. A plurality of battery cells (32) is disposed within the housing such that an end portion (32*a*) thereof is disposed within the at least one isolated space and an intermediate portion (32*b*) thereof is disposed adjacent the cooling air passage. First portions (78) of the at least one isolating wall respectively contact the plurality of battery cells and are comprised of a material that is more flexible and/or elastic than the rigid material of the housing (18).

20 Claims, 7 Drawing Sheets

(52) U.S. Cl.
CPC ....... *H01M 2/1033* (2013.01); *H01M 10/4257* (2013.01); *H01M 10/5014* (2013.01); *H01M 10/5057* (2013.01); *H01M 10/6235* (2015.04); *H01M 10/6556* (2015.04); *H01M 2220/30* (2013.01)

(56) References Cited

U.S. PATENT DOCUMENTS

2003/0082439 A1* 5/2003 Sakakibara ......... H01M 2/0202
    429/120
2010/0248016 A1* 9/2010 Hanawa ............. H01M 2/1055
    429/178
2011/0114350 A1 5/2011 Johnson et al.

FOREIGN PATENT DOCUMENTS

JP  2008251471 A  10/2008
WO  2010019764 A  2/2010

OTHER PUBLICATIONS

Written Opinion from PCT/JP2012/08287.

* cited by examiner

BATTERY PACK FOR USE WITH HAND-HELD ELECTRIC POWER TOOL

CROSS-REFERENCE

The present application is the U.S. National Stage of International Application No. PCT/JP2012/008287 filed on Dec. 25, 2012, which claims priority to U.S. provisional patent application Ser. No. 61/581,957 filed on Dec. 30, 2011, the contents of which are incorporated fully herein.

TECHNICAL FIELD

The technology disclosed herein relates to a battery pack for use with a hand-held electric power tool.

BACKGROUND ART

A battery pack for use with a hand-held electric power tool is disclosed in US 2011/0114350 A1. Such a battery pack comprises a plurality of battery cells, a circuit board that is electrically connected to the plurality of battery cells, and a housing that houses the plurality of battery cells and the circuit board. Contact terminals for electrically connecting with an electric power tool are provided on the circuit board.

US 2003/0082439 A1 discloses a battery pack suitable for use with battery-powered appliances, in which integral portions of the housing are formed as respective securing walls that physically separate and isolate a cooling air passage from the battery terminals of the battery cells disposed therein.

SUMMARY

Because they are types of electrical equipment that contain metal, battery cells and circuit boards are vulnerable to corrosion due to moisture. Therefore, it is preferable to prevent moisture from penetrating (permeating into) the interior of the battery pack housing. Nevertheless, it is not desirable to completely or hermetically seal the entire housing, because heat generated by the battery cells during charging or discharging must be dissipated before excessive heat permanently damages battery cells. That is, if the housing were to be completely or hermetically sealed, the battery cells could overheat and become irreparably damaged. Therefore, to prevent overheating of the battery cells, it has been necessary to define at least one opening in the housing and to passively (naturally) or forcibly ventilate the space inside the housing through the at least one opening. But, if an opening is formed in the housing, there is a risk that moisture will penetrate (permeate into) the interior of the housing.

In addition, contact terminals designed to electrically connect with the electric power tool are provided inside the battery pack housing. The contact terminals physically contact the contact terminals of the electric power tool. Consequently, it is necessary to form one or more openings in the housing for receiving (insertion of) the contact terminals of the electric power tool. But again, if an opening is formed in the housing, there is a risk that moisture will penetrate (permeate into) the interior of the housing.

Thus, if an opening is formed in the housing for any reason and the internal space of the battery pack housing is in fluid or gaseous communication with the external space (i.e. the outside environment), then there is necessarily a risk that moisture will penetrate (permeate into) the interior of the battery pack housing. Furthermore, if moisture reaches the interior of the housing, the circuit board and/or the battery cells might corrode and then fail.

It is an object of the present teachings to reduce the likelihood, or even prevent, failure of the battery pack caused by moisture—even if an internal space of the housing communicates with the outside environment in order to, e.g., provide cooling air to the battery cells during charging and/or discharging.

This object is achieved by the battery pack of claims 1 and 5. Further developments of the inventive subject matter are recited in the dependent claims.

According to one aspect of the present teachings, both an open space and an isolated space are defined inside a housing of the battery pack. The open space is a space that communicates with an external space (e.g. the environment outside of the battery pack housing), and the isolated space is a space that is isolated from the external space and the open space. Furthermore, at least the portions of battery cells and/or a circuit board that are most vulnerable to corrosion caused by moisture or other external influences are disposed in the isolated space(s), whereas portions that are less corrosion-prone are disposed in the open space.

Alternatively, only those portions that need to be disposed in the open space (e.g., portions of the circuit board where the contact terminals are provided) are disposed in the open space, and other portions are disposed in the isolated space(s). In this case, because the battery cells and/or the circuit board pass (extend) through an isolating wall that separates the isolated space and the open space, any gap(s) between the isolating wall and the battery cells, between the isolating wall and the circuit board, or between the isolating wall and both the battery cells and the circuit board could be problematic to minimizing corrosion risks.

Therefore, to minimize corrosion risks according to the present teachings, any portions of the isolating wall that contact the battery cells and/or the circuit board are preferably formed from a material (e.g., a rubber material) that is more flexible and/or elastic than the rigid material forming the housing. If appropriate portions of the isolating wall are formed from a flexible material, then it is possible to prevent any gaps between the isolating wall and the battery cells, between the isolating wall and the circuit board, or between the isolating wall and both the battery cells and the circuit board.

Thus, according to another aspect of the present teachings, a battery pack for use with a hand-held electric power tool can comprise a plurality of battery cells, and a housing that houses the plurality of the battery cells. The housing can have an open space, which communicates with the external space, and an isolated space, which is isolated from the open space. An isolating wall may be disposed along an interface surface between the open space and the isolated space inside the housing to isolate these spaces from one another. Part of each of the battery cells can be positioned in the open space, and another part of each of the battery cells can be positioned in the isolated space. The portions of the isolating wall that contact the battery cells can be formed from a material that is more flexible and/or elastic than the housing. Herein, "part of the battery cell" is not physically limited to one portion of one body, and may be two or more portions that are physically spaced apart.

In another aspect of the present teachings, a battery pack for use with a hand-held electric power tool can comprise a plurality of battery cells, a circuit board that is electrically connected to the plurality of battery cells, and a housing that houses the plurality of battery cells and the circuit board. The housing can have an open space, which communicates with an external space, and an isolated space, which is isolated from the open space. Again, an isolating wall may be disposed along the interface surface between the open space and the isolated space to isolate these spaces from one another. Part of the circuit board can be positioned in the open space, and another part of the circuit board can be positioned in the isolated space. The portion(s) of the isolating wall that contact(s) the circuit board can be formed from a material that is more flexible and/or elastic than the housing.

DETAILED DESCRIPTION

Figure 1:
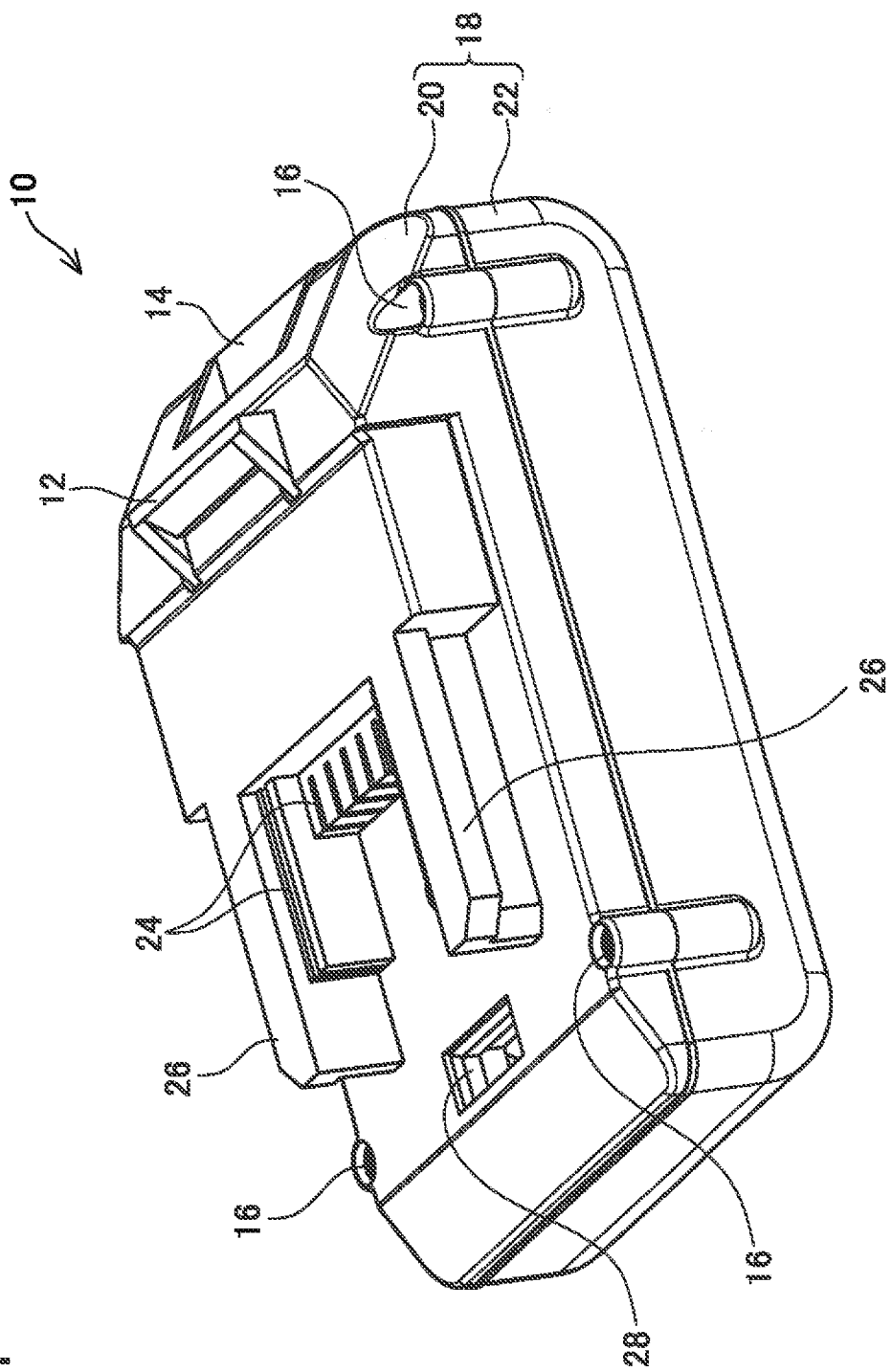
FIG. 1 shows the external appearance of a battery pack according to a first embodiment.

In one embodiment of the present teachings, parts of each of the battery cells positioned in an isolated space are preferably provided with battery cell electrodes. Because the portions that have the battery cell electrodes are vulnerable to corrosion caused by water, such corrosion-prone portions are preferably positioned in an isolated space. Moreover, because other portions are comparatively tolerant of moisture (e.g., they could also be covered with a waterproof sheet), they are preferably positioned in the open space. According to such a design, the battery cells can be cooled via passive or forced ventilation of the open space while the electrodes are protected from any water that might penetrate (permeate into) the open space. In such embodiments, the open space acts as a cooling air passage for the battery cells (and thus the interior of the housing). Thus, "cooling air passage" may be considered interchangeable with "open space" in such embodiments.

In another embodiment of the present teachings, an isolating wall preferably has a plurality of first holes, through which the plurality of battery cells respectively extend, i.e. with one battery cell per first hole. In such a case, each of the first holes is preferably formed or defined so as to be independent of the other first holes, i.e. the plurality of first holes are discrete from each other. Furthermore, a perimetric edge (or rim) of each of the first holes is preferably formed from a material that is more flexible and/or elastic than that of the housing. According to this configuration, it is possible to eliminate minor or small gaps that may exist between the isolating wall and the battery cells due to manufacturing tolerances.

In another embodiment of the present teachings, conductive wires electrically connect a circuit board with the battery cells; furthermore, one end of each of the conductive wires is preferably fixed to a part of the circuit board that is disposed in the isolated space. In addition or instead, contact terminals, which electrically connect with an electric power tool, are preferably provided on a part of the circuit board that is disposed in the open space. In the circuit board, the portions to which one end of each of the conductive wires, which electrically connect the circuit board and the battery cells, is fixed are comparatively vulnerable to moisture. Therefore, such portions of the circuit board are preferably disposed in the isolated space. In addition, other portions of the circuit board are also preferably disposed in the isolated space. However, the portions, in which the contact terminals for the electric power tool are provided, are necessarily disposed in the open space.

In the above-mentioned embodiment, the isolating wall preferably has a second hole, through which the circuit board is passed. In this case, the perimetric edge (rim) of the second hole is preferably formed from a material that is more flexible and/or elastic than the housing. According to this design, it is possible to eliminate any minor or small gap that may exist between the isolating wall and the circuit board due to manufacturing tolerances.

In the above-mentioned embodiment, the isolating wall preferably further includes the plurality of the first holes, through which the plurality of the battery cells respectively extend, i.e. with one battery cell per first hole. In this case, each of the first holes is preferably formed or defined so as to be independent of the other first holes and the second holes, and the perimetric edge (rim) of each of the first holes is preferably formed from a material that is more flexible and/or elastic than the housing. Likewise, according to this design, it is possible to eliminate any minor or small gaps that may exist between the isolating wall and the battery cells due to manufacturing tolerances.

In another embodiment of the present teachings, the portions where the isolating wall and the housing contact are also preferably formed from a material that is more flexible and/or elastic than the housing. According to this design, it is possible to eliminate any gap(s) that may exist between the isolating wall and the housing due to manufacturing tolerances.

In one embodiment of the present invention, a joint of the housing (or at least a portion of the joint) may be located in or along the isolated space. In this case, it is preferable to dispose a sealing member at least partially inside the isolated space as well as along the joint of the housing (or at least a portion of the joint). The sealing member is preferably formed from a material that is more flexible and/or elastic than the housing. In this case, it is possible to exclude or block moisture that would otherwise penetrate the housing via the joint. For example, at least part of the sealing member may be integrally formed with the isolating wall, e.g., with no seam therebetween. Naturally, the isolating wall could alternatively be formed as a separate member that is independent of the sealing member, but is affixed or adhered thereto.

In another embodiment of the present teachings, the entire isolating wall is preferably formed from a material that is more flexible and/or elastic than the housing. According to this design, no joint would be formed in the isolating wall, which would make it possible to also exclude or block a slight or small amount of moisture that would otherwise penetrate the isolated space.

In another embodiment of the present teachings, it is possible to use natural rubber, synthetic rubber, some other rubber material, and/or an elastomer as the material that is more flexible and/or elastic than the housing discussed above. Rubber materials and elastomers have appropriate flexibility for use with the present teachings and are also excellent waterblocking materials. Further detailed examples will be provided below.

In another embodiment of the present teachings, the battery cells are preferably disposed parallel to one another. According to this configuration, the electrodes of each of the battery cells are positioned adjacent to one another, which makes it easy to dispose all the electrodes at one end of the battery cells collectively in a first isolated space. The electrodes at the opposite end of the battery cells are also preferably collectively disposed in a second isolated space that is separate and independent of the first isolated space. However, it is also possible to allow fluid or gaseous communication between the first and second isolated spaces, as long as there is no fluid or gaseous communication with the outside environment.

In another embodiment of the present teachings, it is preferable to dispose the plurality of battery cells in at least two tiers and to dispose the fewest battery cells (e.g., just one) in the uppermost tier. According to this configuration, in the space of the uppermost tier where battery cells are not disposed, it is possible to dispose, for example, contact terminals for connecting with the electric power tool, a locking member adapted to lock the battery pack to the electric power tool, and/or any other appropriate structure for use with power tool battery packs. For example, it is preferable to dispose the contact terminals on one side of the cells in the uppermost tier, and to dispose the locking member on the other side of the cells in the uppermost tier.

First Embodiment

A battery pack 10 according to a first embodiment will now be explained with reference to FIGS. 1-6. The battery pack 10 of the first embodiment is configured or adapted to be used with a hand-held electric power tool, and supplies electric current (power) to the electric power tool. The battery pack 10 is adapted or configured such that it is attachable to and detachable from the electric power tool. The battery pack 10 is rechargeable and can be used repeatedly.

As shown in FIGS. 1 to 4, the battery pack 10 comprises a housing 18. The housing 18 is formed from a plastic material, preferably a hard, inflexible plastic material. The housing 18 comprises an upper piece (half) 20 and a lower piece (half) 22. The upper piece 20 and the lower piece 22 are joined or fastened to one another by a plurality of screws 16. Tool engaging parts (projections) 26 and a plurality of slits (slots) 24 are formed in or defined on the upper piece 20. The tool engaging parts 26 are configured or adapted to mechanically engage (interlock) with the electric power tool. The tool engaging parts 26 of the present embodiment may be configured as two rails. In the alternative, the tool engaging parts 26 may be configured as more than two rails, or may be configured as any other mechanical linkage or connector that permits detachable attachment of the battery pack 10 to the tool. Each of the slits 24 defines an opening, through or in which a contact terminal of the electric power tool is received. An internal space of the housing 18 communicates with an external space (the outside environment) via the slits 24. At least one contact terminal 34 of the battery pack 10 is provided in or on the inner side of each of the slits 24.

As shown in FIGS. 1 to 5, the battery pack 10 further comprises a locking member (e.g., a latch or hook) 12 and a lock releasing member (e.g., a button or tab) 14. The locking member 12 engages with a corresponding engaging or interlocking portion of the electric power tool and thereby releasably locks or latches the battery pack 10 onto the electric power tool. The locking member 12 is urged or biased towards a locking (or latching) position by an elastic member 30, and thereby can move in and out with respect to the surface of the housing 18. As one representative, non-limiting example, the elastic member 30 may be a coil spring or other type of spring, e.g., a resiliently deformable material. The lock releasing member 14 serves as a manual operating member, which is moved (pressed down) by a user in order to release the lock between the battery pack 10 and the electric power tool. When the user presses the lock releasing member 14, the locking member 12 is drawn into the housing 18; on the other hand, when the user releases or puts/moves back the lock releasing member 14, the locking member 12 projects from the housing 18 and will lock (latch) the battery pack 10 to the power tool when the locking member 12 is disposed inside the housing of the power tool. As one representative, non-limiting example, the locking member 12 and the lock releasing member 14 may be formed integrally as a single component having no seams therein.

Figure 2:
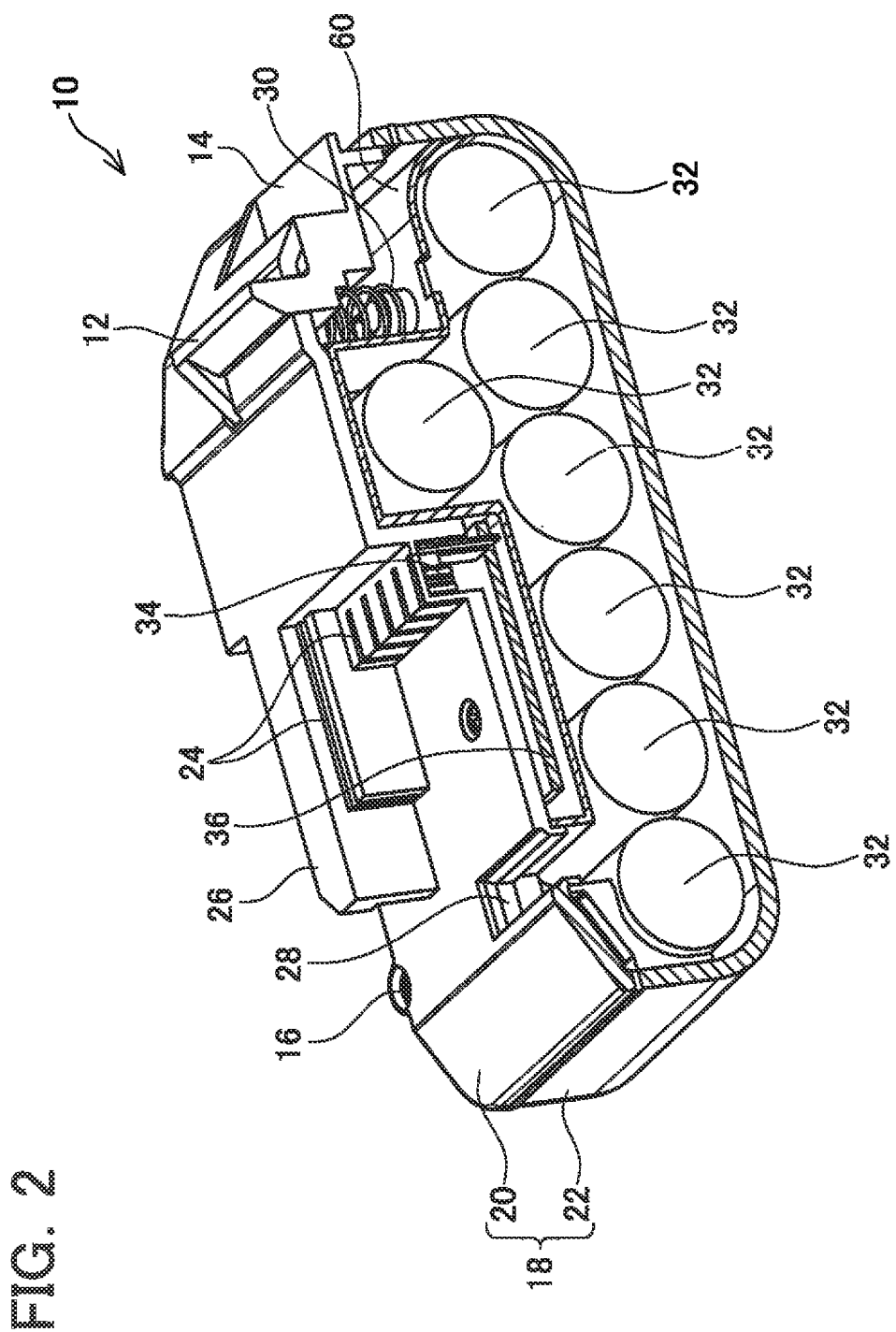
FIG. 2 is a cross-sectional view of the battery pack according to the first embodiment, wherein the sectional plane is perpendicular to the longitudinal directions of battery cells.

As shown in FIGS. 1 and 2, at least one vent 28 is formed or defined in the housing 18. The vent 28 is an opening that enables the internal space of the housing 18 to be ventilated. The internal space of the housing 18 communicates with the external space (outside environment) through the vent(s) 28. For example, the vent 28 may be configured or adapted to receive a flow of cooling air supplied by a fan disposed in a battery charger. In addition or in the alternative, natural or passive ventilation of the housing 18 may take place through the vent(s) 28.

As shown in FIGS. 2 to 5, the battery pack 10 further comprises a plurality of battery cells 32 disposed within the housing 18. As one representative, non-limiting example, the battery pack 10 of the present embodiment comprises seven battery cells 32, and each battery cell 32 is preferably a lithium ion cell. However, the number of the battery cells 32 is not limited to seven, and the type of the battery cells 32 is likewise not limited to lithium ion cells; e.g., nickel cadmium or nickel metal hydride calls may also be utilized. The battery cells 32 are connected in series via a plurality of connecting plates 38, which are formed from a conductive material, such as metal. The nominal (rated) voltage of each of the battery cells 32 is 3.6 volts, and the nominal (rated) voltage of the battery pack 10 as a whole is thus 25.2 volts.

The battery cells 32 are disposed so that their respective longitudinal axes are parallel to one another. The battery cells 32 are arrayed or stacked in two tiers. In the present representative embodiment, six of the battery cells 32 are disposed in the lower tier, and one of the battery cells 32 is disposed in the upper tier. The contact terminals 34 are disposed on one lateral side of the upper tier battery cell 32, and the locking member 12 is disposed on the other lateral side of the upper tier battery cell 32. The overall size of the battery pack 10 can be reduced by disposing at least one of the battery cells 32 between the contact terminals 34 and the locking member 12. However, it should be noted that the number of the battery cells 32 disposed in the upper tier and the number of the battery cells 32 disposed in the lower tier are not particularly limited. For example, in a representative battery pack 10 having a total of seven battery cells 32, two of the battery cells 32 may be disposed in the upper tier, and five of the battery cells 32 may be disposed in the lower tier. Alternatively, three of the battery cells 32 may be disposed in the upper tier, and four of the battery cells 32 may be disposed in the lower tier. Furthermore, the number of the battery cells 32 disposed in the upper tier can be greater than the number of the battery cells 32 disposed in the lower tier.

Figure 3:
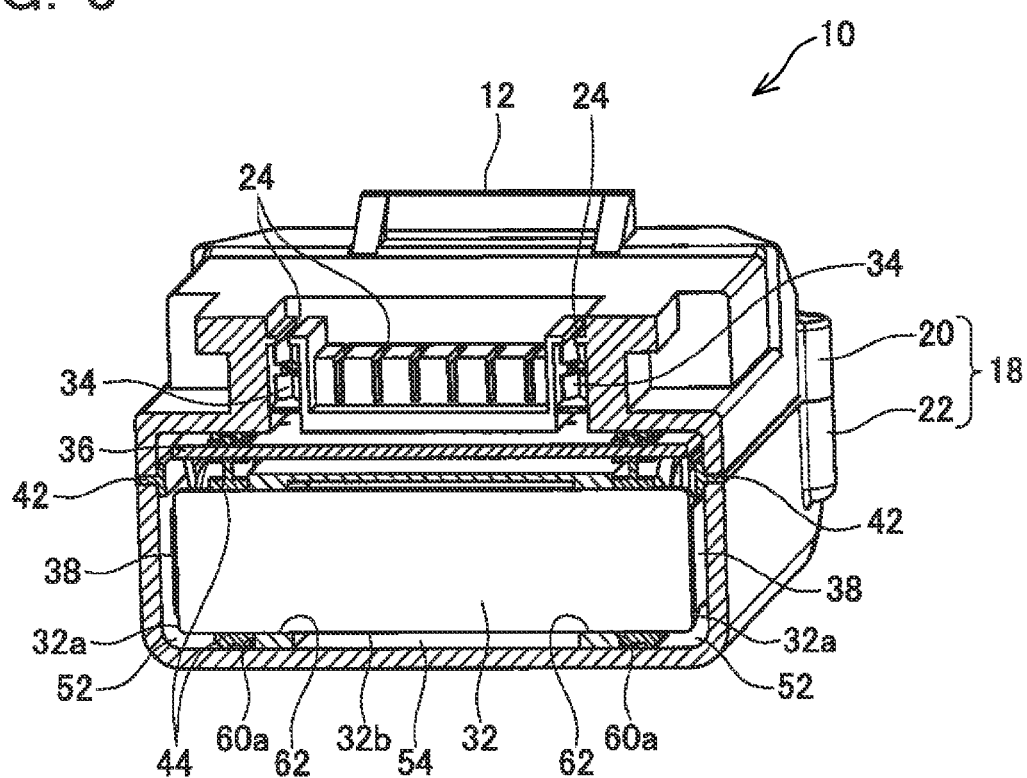
FIG. 3 is a cross-sectional view of the battery pack according to the first embodiment, wherein the sectional plane is parallel to the longitudinal directions of the battery cells.
Figure 4:
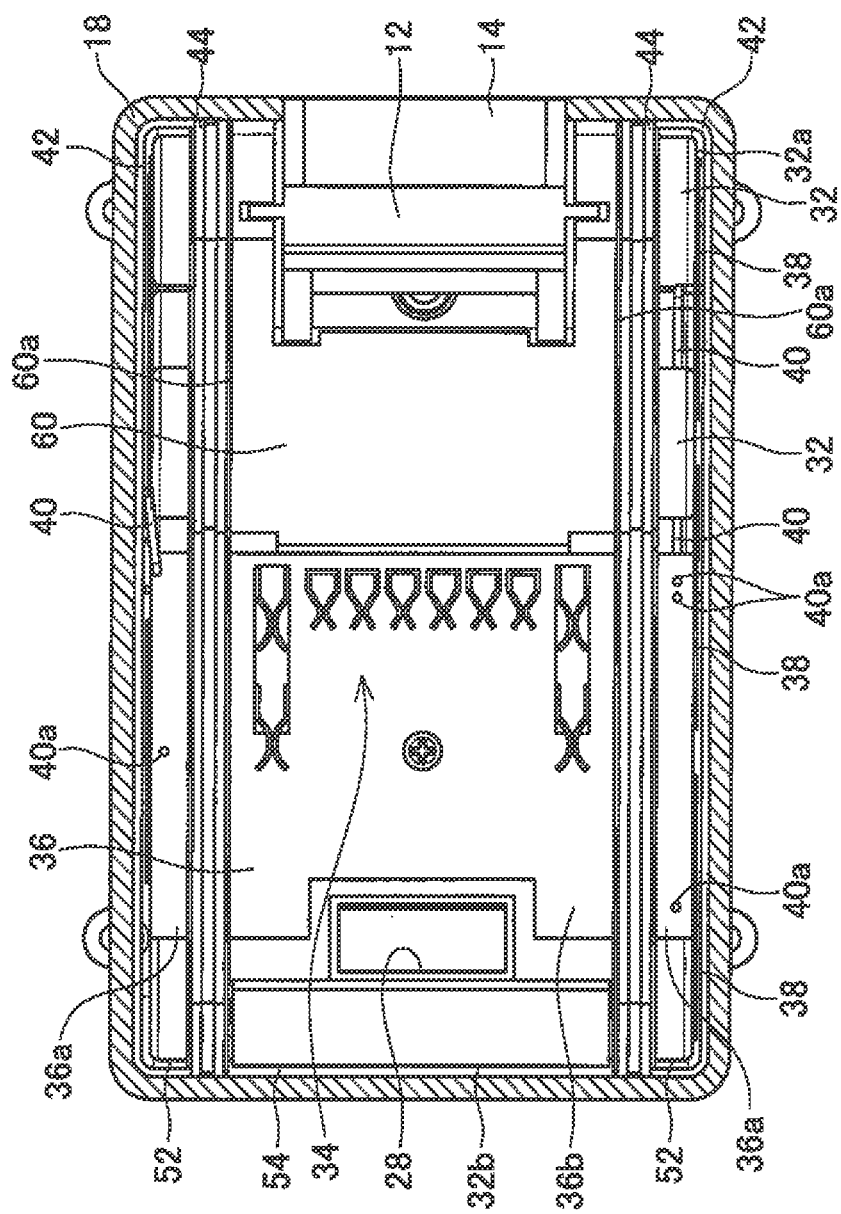
FIG. 4 is a plan view that shows the battery pack according to the first embodiment, wherein an upper piece (half) of its housing has been removed.
Figure 5:
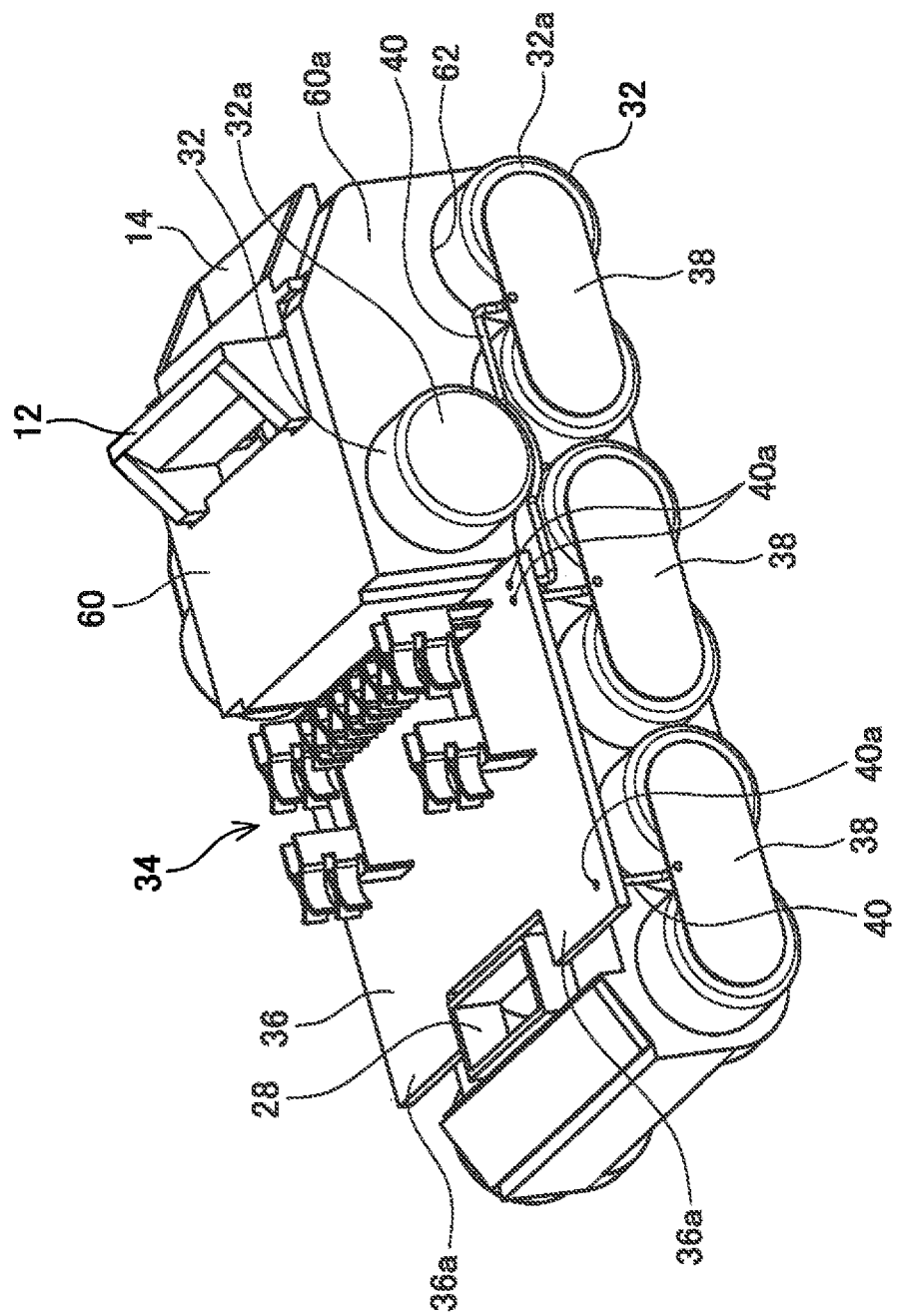
FIG. 5 is an oblique view that shows the battery pack according to the first embodiment, wherein the entire housing has been removed.

As shown in FIGS. 2 to 5, the battery pack 10 further comprises a battery cell holder 60 (hereinafter "cell holder 60"). The cell holder 60 is preferably formed from a plastic material. In the present embodiment, the cell holder 60 generally has a box shape or form with no bottom. However, it should be understood that the cell holder 60 may have a box shape with a bottom, or may have a variety of other shapes. That is, a wide variety of shapes and structures can be used for the cell holder 60, as long as the cell holder 60 can hold the plurality of battery cells 32 in position relative to each other. As shown in FIGS. 3 and 5, a plurality of holes 62 is formed in each side surface 60a of the cell holder 60 and each hole 62 is designed to hold or receive one battery cell 32 with the longitudinal end portions of each battery cell 32 extending outside the cell holder 62. Therefore, both end surfaces 32a of each battery cell 32 are positioned outside of the cell holder 60, and an intermediate or middle portion 32b of each battery cell 32 is disposed in the interior of the cell holder 60. One or more vent(s) 28 is (are) formed or defined in the cell holder 60 so as to correspond and communicate with the vent(s) 28 formed or defined in the housing 18. The internal space (interior) of the cell holder 60 communicates with the external space (outside environment) via the vent(s) 28, which constitute(s) a passageway for the flow of cooling air that cools the battery cells 32.

As shown in FIGS. 1 to 5, the battery pack 10 further comprises a circuit board 36. The circuit board 36 is provided with the plurality of contact terminals 34, which were described above. The circuit board 36 is electrically connected to the plurality of battery cells 32 via a plurality of conductive wires 40. The plurality of battery cells 32 is electrically connected to the plurality of contact terminals 34 via the circuit board 36. In addition, the circuit board 36 is preferably provided with at least one microprocessor, at least one memory and/or storage, one or more sensors, and a printed circuit pattern that electrically connects the various components disposed on and attached to the circuit board 36.

As shown in FIGS. 3 and 4, the battery pack 10 further comprises a pair of isolating walls 44. The pair of isolating walls 44 is positioned inside the housing 18. The two isolating walls 44 are respectively disposed along the corresponding side surfaces 60a of the cell holder 60. Preferably, each of the isolating walls 44 is formed from or comprised of a material that is more flexible than the material forming the housing 18. As one representative, non-limiting example, the isolating walls 44 of the present embodiment are formed from a rubber material that is more flexible than the plastic material forming the housing 18. Further detailed examples are provided below. Each of the isolating walls 44 partitions the internal space of the housing 18 such that the internal space is gastight (air-tight), or at least substantially gastight (air-tight) relative to the longitudinal ends of the battery cells 32. That is, as shown in FIGS. 3 and 4, the internal space of the housing 18 is compartmentalized into a cooling air passage 54 (hereinafter "open space"), which is interposed between the two isolating walls 44, and two isolated spaces 52, which are respectively positioned on the two lateral sides of the open space 54. The open space 54 communicates with the external space (outside environment) via the vent(s) 28, the plurality of slits 24, and/or any other opening in the housing 18. That is, air from outside of the housing 18 can pass through the interior of the housing 18 via the open space 54. In contrast, both of the isolated spaces 52 are completely enclosed by the respective isolating walls 44 and the housing 18 so as to be isolated in an at least substantially gastight (airtight) manner from both the external space (outside environment) and the open space 54.

Because the isolated spaces 52 are both at least substantially sealed (if not completely or hermetically sealed), the pressure inside each of the isolated spaces 52 will vary according to the temperature inside the particular isolated space 52. For example, because the temperature inside the isolated spaces 52 will rise when the battery pack 10 is being discharged or charged (due to heat generated by the battery cells 32), the pressure inside the isolated spaces 52 will also rise. At this time, if the pressure differentials between the isolated spaces 52 and the open space 54 become too large, the gas-tightness (air-tightness) effected by the isolating walls 44 may be lost; for example, air could leak between the isolating walls 44 and the housing 18. In such a case, when the temperature inside the isolated spaces 52 subsequently falls (i.e. when the battery pack 10 is not being used), the isolated spaces 52 will become negatively pressurized relative to the open space 54 and the external space (outside environment, i.e. the ambient pressure), i.e. the isolated space 52 will be at a pressure lower than ambient pressure. Consequently, outside air, which typically contains at least some moisture, will penetrate (permeate into) the isolated spaces 52 in a disadvantageous manner. In order to avoid this moisture penetration problem, the present teachings propose to suppress or limit pressure fluctuations inside the two isolated spaces 52 to a level at which the gas-tightness of the isolated spaces 52 will not be lost.

In order to suppress or limit pressure fluctuations, the isolating walls 44 of the present embodiment are formed from an elastic material, e.g., a rubber material, as was mentioned above and will be further described below, and therefore at least a portion of each isolating wall 44 is elastic and/or flexible. As a result, each of the isolating walls 44 (or at least a portion thereof) is capable of deforming in accordance with changes in the pressure inside the corresponding isolated space 52, thereby functioning as a kind of diaphragm. If at least a portion of the isolating walls 44 can expand to accommodate increased pressures, pressure fluctuations inside the isolated spaces 52 will be limited or suppressed. In addition or in the alternative, the required elasticity of the isolating walls 44 can be achieved not only by selecting an appropriate elastic material for forming at least a portion the isolating walls 44, but also by suitably designing the shape of the isolating walls 44. For example, a recessed part or a protruding part may be formed in part or all of each of the isolating walls 44, and/or a portion of each of the isolating walls 44 may be designed or made thinner than other portions of the isolating walls 44.

As was described above, the battery pack 10 of the present embodiment includes the open space 54 and the two isolated spaces 52 inside the housing 18. The open space 54 communicates with the external space (outside environment) through the vent(s) 28. Accordingly, it is possible to prevent overheating of the battery cells 32 by naturally (passively) or forcibly ventilating the open space 54, e.g., by causing a flow of cooling air to pass across the middle portions of the battery cells 32. However, by providing the open space 54 inside the housing 18, there is a risk that moisture will penetrate (permeate into) the interior of the housing 18. Accordingly, the battery pack 10 of the present embodiment provides the isolated spaces 52 inside the housing 18; furthermore, portions of the battery cells 32 (e.g., the metal contacts on the longitudinal ends) or the circuit board 36, or both, that are particularly vulnerable to moisture are disposed within the isolated spaces 52.

As one representative, non-limiting example, the present embodiment disposes both longitudinal end surfaces 32a of each of the battery cells 32 in the respective isolated spaces 52. This design is advantageous because the positive and negative electrodes (metal contacts) are provided on the two end surfaces 32a of the battery cells 32, and these electrodes, along with the connecting plates 38, which are affixed thereto, are vulnerable to corrosion caused by moisture. In addition, as shown in FIG. 4, both end (lateral edge) portions 36a of the circuit board 36 are disposed in the respective isolated spaces 52. This design is advantageous because one end 40a of each of the conductive wires 40, which electrically connects the circuit board 36 to the battery cells 32, is fixed by solder to the corresponding end portion 36a of the circuit board 36, and such portions are vulnerable to corrosion caused by moisture. Furthermore, the battery cells 32 and the circuit board 36 may be electrically connected by directly connecting the connecting plates 38, which may be conductive (metal) plates, to one end of the circuit board 36—without using the conductive wires 40. Alternatively, instead of the conductive wires 40, the battery cells 32 and the circuit board 36 may be electrically connected by a flexible board (e.g., a flexible printed circuit board). In any case, the portions of the circuit board 36, to which the one end of each conductor that electrically connects the corresponding battery cell 32 and the circuit board 36 is fixed, may be disposed in the respective isolated spaces 52.

On the other hand, the intermediate or middle portions 32b of the battery cells 32 are disposed within the open space 54. The intermediate portions 32b of the battery cells 32 are preferably covered by one or more waterproof sheets and are thus comparatively tolerant of moisture (i.e. relatively corrosion-proof as compared to the metal portions of the battery cells 32 and conductive wires/plates). In addition, an intermediate portion 36b of the circuit board 36 is also disposed in the open space 54. The intermediate portions 32b of the battery cells 32 are disposed in the open space 54 adjacent to where the plurality of contact terminals 34 is disposed on the surface of the upper piece 20.

As shown in FIGS. 3 and 4, the battery pack 10 further comprises sealing members 42. As one representative, non-limiting example, the sealing members 42 of the present embodiment may be formed from an elastic material, e.g., from a rubber material such that the same material or a different material as the isolating walls 44. Representative examples of elastomeric materials for forming the sealing members 42 are given below.

The sealing members 42 are disposed along at least one portion of the joint of the housing 18 between the upper piece 20 and the lower piece 22. The sealing members 42 exclude or block moisture that would otherwise penetrate (permeate into) the isolated spaces 52 via the joint of the housing 18. In the present embodiment, the sealing members 42 are provided only along the part of the joint between the upper piece 20 and the lower piece 22 that is positioned along the isolated spaces 52. That is, the sealing members 42 are not provided along the part of the joint that is positioned along or adjacent to the open space 54. However, as another embodiment of the present teachings, the sealing member(s) 42 also may be provided along the part of the joint that is positioned along the open space 54; e.g., a single (endless) seal or gasket may be disposed around the entire length of the joint. The material of the sealing members 42 is not particularly limited, but is preferably a material (e.g., a rubber material or an elastomer) that is more flexible than the material forming the housing 18, as will be further described below.

Figure 6:
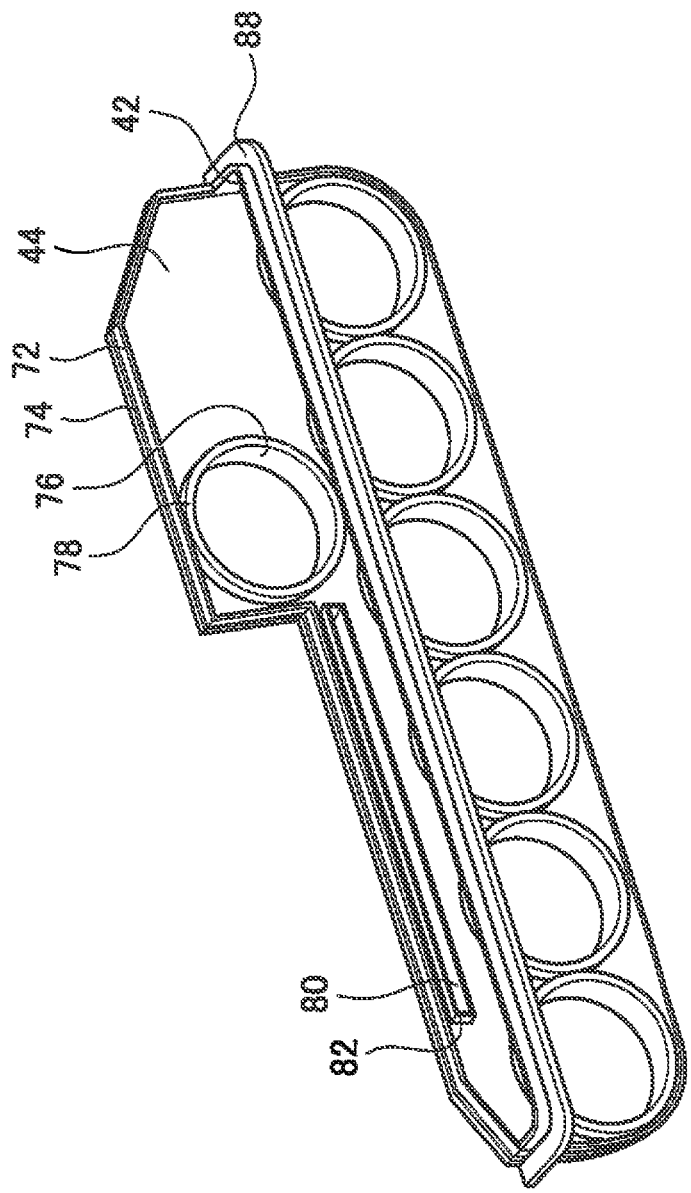
FIG. 6 is an oblique view that shows an isolating wall and a sealing member of the battery pack according to the first embodiment.

Referring now to FIG. 6, a representative structure of each of the isolating walls 44 and each of the sealing members 42 will now be explained. A perimetric edge or rim 72 of the isolating wall 44 is the portion thereof that contacts an inner surface of the housing 18. This portion is preferably formed from an elastic material, such as a rubber material, and is more flexible than the housing 18. Therefore, the small gap between the isolating wall 44 and the housing 18 is also eliminated and/or sealed. Furthermore, the perimetric edge 72 of the isolating wall 44 is thicker than other portions thereof, and a groove or channel 74 is preferably formed in the perimetric edge 72. This configuration increases the gas-tightness (air-tightness) between the isolating wall 44 and the housing 18.

The isolating wall 44 has a plurality of first holes 76. The first holes 76 are discrete and independent of one another, i.e. there is solid material separating each of the first holes 76. Each first hole 76 is adapted or configured to receive a portion of a single respective battery cell 32 therethrough. Perimetric edges (rims) 78 of the first holes 76 contact the respective battery cells 32, are formed, e.g., from a rubber material and are more flexible than the housing 18. Therefore, small gaps between the isolating walls 44 and the battery cells 32 are also eliminated or sealed. Furthermore, the perimetric edges 78 of the first holes 76 are thicker than other portions of the isolating wall 44. This configuration further increases the gas-tightness (air-tightness) between the isolating wall 44 and the battery cells 32 by providing a wider sealing area between the isolating wall 44 and the battery cells 32.

The isolating wall 44 further includes a second hole 80 that is discrete and independent of the first holes 76. The second hole 80 is adapted or configured to receive a portion of the circuit board 36 therethrough. A perimetric edge (rim) 82 of the second hole 80 contacts the circuit board 36, is formed, e.g., from a rubber material and is more flexible than the housing 18. Therefore, the small gap between the isolating wall 44 and the circuit board 36 is also eliminated or sealed. Furthermore, the perimetric edge 82 of the second hole 80 is thicker than other portions. This configuration further increases the gas-tightness (air-tightness) between the isolating wall 44 and the circuit board 36 by providing a wider sealing area between the isolating wall 44 and the circuit board 36.

The sealing member(s) 42 of the present embodiment is (are) formed integrally with the isolating wall 44, i.e. from the same material and without a seam therebetween. The sealing member 42 comprises a flange 88. The flange 88 is inserted between the upper piece 20 and the lower piece 22 when the upper piece 20 is joined with the lower piece 22 of the housing 18. Therefore, the small gap in the joint between the upper piece 20 and the lower piece 22 is also eliminated or sealed. However, it should be understood that the sealing member 42 is not required to be formed integrally with the isolating wall 44, i.e. it may be formed separately and then adhered or otherwise affixed to the isolating wall 44. In addition, it is also possible to partially or entirely omit the sealing member 42 as long as the joint between the upper piece 20 and the lower piece 22 is sufficiently gastight.

Although the entire isolating wall 44 of the present embodiment is formed from a rubber material, it would be sufficient if only a part or portion of the isolating wall 44 is formed from a rubber material or some other material that is more flexible than the housing 18. In this case, the portions 78 that contact the battery cells 32, the portion 72 that contacts the housing 18, or the portion 82 that contacts the circuit board 36, or any arbitrary combinations thereof, should be formed from a material that is more flexible than the housing 18. For example, another part of the isolating wall 44 may be formed from the same material as the housing 18 or even from a material that is stiffer than that of the housing 18. In this case, the isolating wall 44 may be formed by the combination of two or more components. In any aspect or embodiment of the present teachings, the material that is more flexible than the material forming the housing 18 preferably may be selected from the group, e.g., of a natural rubber, a synthetic rubber material, or an elastomer, or any elastomeric material described further below.

Second Embodiment

A battery pack 110 of a second embodiment will now be explained with reference to FIG. 7. The battery pack 110 of the present embodiment differs from the battery pack 10 of the first embodiment in the number of the battery cells 32 it comprises. Other aspects of the configuration are the same as those of the battery pack 10 of the first embodiment. Elements in common with the first embodiment have been assigned the same reference numbers, and therefore explanations thereof are omitted herein. Furthermore, in the battery pack 110 of the present embodiment, the isolated spaces 52 and the open space 54 also are compartmentalized inside the housing 18; furthermore, parts of each of the battery cells 32 and parts of the circuit board 36 are disposed inside the isolated spaces 52.

Figure 7:
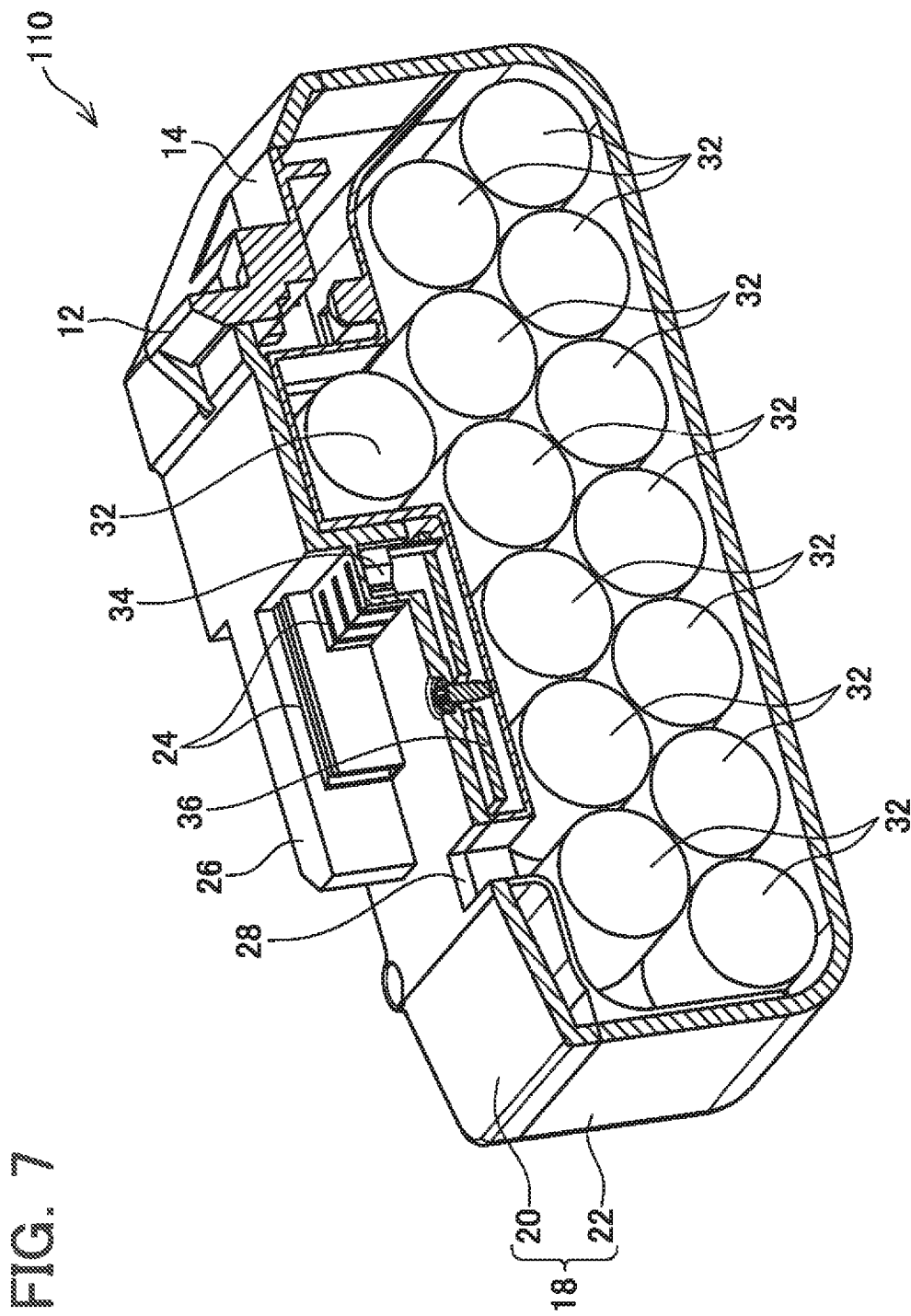
FIG. 7 is a cross-sectional view of the battery pack according to a second embodiment, wherein the sectional plane is perpendicular to the longitudinal directions of the battery cells.

As shown in FIG. 7, the battery pack 110 of the present embodiment comprises fourteen battery cells 32. As one representative, non-limiting example, the fourteen battery cells 32 are connected two at a time in parallel, and the seven pairs of parallel-connected battery cells 32 are connected in series. The fourteen battery cells 32 are disposed parallel to one another. The fourteen battery cells 32 are disposed such that they are arrayed, or stacked, in three tiers. Seven of the battery cells 32 are disposed in the lowermost tier, six of the battery cells 32 are disposed in the middle tier, and only one of the battery cells 32 is disposed in the uppermost tier. The contact terminals 34 are disposed on one lateral side of the uppermost tier battery cell 32, and the locking member 12 is disposed on the other lateral side of the uppermost tier battery cell 32. This structure is common to the battery pack 10 of the first embodiment. By disposing at least one of the battery cells 32 between the contact terminals 34 and the locking member 12, it is possible to reduce the overall size of the battery pack 10. Similar to the preceding embodiment, each of the battery cells 32 may be a lithium ion cell whose nominal voltage is 3.6 volts. In this case, the nominal voltage of the entire battery pack 110 of the present embodiment is 25.2 volts.

The housing 18 (i.e. the upper piece (half) 20 and the lower piece (half) 22) is preferably made of a polycarbonate (PC) material or another material having similar hardness and durability characteristics thereto. The Young's modulus of PC is 2.2 GPa (ISO-compliant). More generally, the housing 18 preferably exhibits a Young's modulus in the range of 1.0-3.0 GPa, more preferably 2.0-2.5 GPa.

At least a portion (or all) of the isolating wall(s) 44 and/or the sealing member(s) 42 should thus be made of a material that is softer, more elastic and/or more flexible than the housing 18. As was noted above, the isolating wall(s) 44 and/or the sealing member(s) 42 is (are) preferably made of an elastomeric material, such as a rubber material, more preferably a rubber packing (gasket). Generally speaking, the hardness of rubber materials is determined by using a durometer according to a method specified in the ISO standard. A preferred hardness range according to durometer scale-type A (Shore A) for part or all of the isolating wall(s) 44 and/or the sealing member(s) 42 is between 70 to 90.

As was noted above, the composition of the elastomeric or rubber material is not particularly limited as long as the material has a suitable elasticity, hardness, durability and moisture-sealing properties. Thus, without limitations, unsaturated rubbers may be advantageously utilized with the present teachings, such as natural or synthetic polyisoprene, polybutadiene, chloroprene rubber, butyl rubber (including halogenated butyl rubbers), styrene-butadiene rubber and nitrile rubber (including halogenated nitrile rubbers) and/or mixtures thereof. In the alternative, without limitations, saturated rubbers may be advantageously utilized with the present teachings, such as ethylene propylene rubber, epichlorohydrin rubber, polyacrylic rubber, silicone rubber, flurosilicone rubber, fluoroelastomers, perfluoroelastomers, polyether block amides, chlorosulfonated polyethylene, and ethylene-vinyl acetate and/or mixtures thereof. The rubbers may be vulcanized or not vulcanized.

While thermosetting elastomers are generally preferable, thermoplastic elastomers may also be utilized in appropriate circumstances, such as without limitation, styrenic block copolymers, polyolefins, polyurethanes, polyesters and polyamides and/or mixtures thereof.

Of course, any conventional fillers may be incorporated into the elastomeric material in accordance with teachings well known in the elastomer art.

Additional representative embodiments of the present teachings disclosed herein include, but are not limited to:

1. A battery pack for use with a hand-held electric power tool, comprising:

a plurality of battery cells;

a housing that houses the battery cells and has an open space, which communicates with an external space, and an isolated space, which is isolated from the open space; and an isolating wall, which is disposed along an interface surface between the open space and the isolated space inside the housing, that isolates both of the spaces from one another;

wherein, part of each of the battery cells is positioned in the open space, and an other part of each of the battery cells is disposed in the isolated space; and portions of the isolating wall that contact the battery cells are formed from a material that is more flexible than that of the housing.

2. A battery pack according to embodiment 1, wherein a battery cell electrode is provided on a part of each of the battery cells positioned in the isolated space.

3. A battery pack according to embodiment 1 or embodiment 2, wherein the isolating wall has a plurality of first holes, through which the plurality of battery cells is passed, one battery cell per first hole; and each of the first holes is formed so as to be independent of the other first holes, and a perimetric edge of each of the first holes is formed from a material that is more flexible than that of the housing.

4. A battery pack according to any one of embodiment 1 to embodiment 3, further comprising:

a circuit board, which is electrically connected to the battery cells and is housed in the housing;

wherein, part of the circuit board is positioned in the open space and an other part of the circuit board is positioned in the isolated space; and a portion of the isolating wall that contacts the circuit board is also formed from a material that is more flexible than that of the housing.

5. A battery pack according to embodiment 4, wherein one end of a conductor that electrically connects the circuit board and the battery cells is fixed to the part of the circuit board that is disposed in the isolated space.

6. A battery pack according to embodiment 5, wherein
the conductor is at least one element selected from the group consisting of a conductive wire, a conductive plate, and a flexible board.

7. A battery pack according to embodiment 4 or embodiment 5, wherein
a contact terminal, which electrically connects to the electric power tool, is provided to the part of the circuit board disposed in the open space.

8. A battery pack according to any one of embodiment 4 to embodiment 7, wherein
the isolating wall has a second hole, through which the circuit board is passed; and
a perimetric edge of the second hole is formed from a material that is more flexible than that of the housing.

9. A battery pack according to embodiment 8, wherein
the isolating wall further has the plurality of first holes, through which the plurality of battery cells is passed, one battery cell per first hole; and
each of the first holes is formed so as to be independent of the other first holes and the second hole, and the perimetric edge of each of the first holes is formed from a material that is more flexible than that of the housing.

10. A battery pack according to any one of embodiment 1 to embodiment 9, wherein
the portion of the isolating wall that contacts the housing is also formed from a material that is more flexible than that of the housing.

11. A battery pack according to any one of embodiment 1 to embodiment 10, wherein
the isolating wall deforms in accordance with changes in pressure inside the isolated space and suppresses changes in the pressure inside the isolated space.

12. A battery pack according to embodiment 11, wherein
at least part of the isolating wall is formed thinner than other portions or is molded in an uneven shape, and swells and shrinks in accordance with changes in the pressure inside the isolated space.

13. A battery pack according to embodiment 11, wherein
the isolating wall comprises at least one recessed part or protruding part; and
the recessed part or the protruding part deforms in accordance with pressure changes inside the isolated space.

14. A battery pack according to any one of embodiment 1 to embodiment 13, further comprising:
a sealing member;
wherein,
the sealing member is positioned inside the isolated space, is disposed along a joint of the housing, and is formed from a material that is more flexible than that of the housing.

15. A battery pack according to embodiment 14, wherein
the sealing member is formed integrally with the isolating wall.

16. A battery pack according to any one of embodiment 1 to embodiment 15, wherein
the entire isolating wall is formed from a material that is more flexible than that of the housing.

17. A battery pack according to any one of embodiment 1 to embodiment 16, wherein
the material that is more flexible than that of the housing is a material selected from the group consisting of natural rubber, synthetic rubber, some other rubber material, and an elastomer.

18. A battery pack for use with a hand-held electric power tool, comprising:
a plurality of battery cells;
a circuit board, which is electrically connected to the battery cells;
a housing that houses the battery cells and the circuit board and has an open space, which communicates with an external space, and an isolated space, which is isolated from the open space; and
an isolating wall, which is disposed along an interface surface between the open space and the isolated space inside the housing and isolates both spaces from one another;
wherein,
part of the circuit board is positioned in the open space and an other part of each of the circuit board is positioned in the isolated space; and
a portion of the isolating wall that contacts the circuit board is formed from a material that is more flexible than that of the housing.

19. A battery pack according to embodiment 18, wherein
the isolating wall has a second hole, through which the circuit board is passed; and
a perimetric edge of the second hole is formed from a material that is more flexible than that of the housing.

20. A battery pack according to embodiment 18 or embodiment 19, wherein
one end of a conductor, which electrically connects the circuit board and the battery cells, is fixed to one part of the circuit board, which is disposed in the isolated space.

21. A battery pack according to embodiment 20, wherein
the conductor is at least one element selected from the group consisting of a conductive wire, a conductive plate, and a flexible board.

22. A battery pack according to any one of embodiment 18 to embodiment 21, wherein
a contact terminal, which electrically connects to the electric power tool, is provided to the part of the circuit board that is disposed in the open space.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved battery packs for power tools, as well as methods for manufacturing and using the same.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE SIGNS LIST 10, 110: Battery pack
12: Locking member
14: Lock releasing member
18: Housing
20: Upper piece of housing
22: Lower piece of housing
24: Slit
26: Tool engaging part
28: Vent
30: Elastic member
32: Battery cell
32a: End surface of battery cell
32b: Intermediate portion of battery cell
34: Contact terminal
36: Circuit board
36a: End portion of circuit board
36b: Intermediate portion of circuit board
38: Connecting plate
40: Conductive wire
40a: One end of conductive wire
42: Sealing member
44: Isolating wall
52: Isolated space
54: Open space
60: Cell holder
60a: Side surface of cell holder
62: Hole of cell holder
72: Perimetric edge of isolating wall
74: Groove of isolating wall
76: First hole of isolating wall
78: Perimetric edge of first hole
80: Second hole of isolating wall
82: Perimetric edge of second hole
88: Flange of sealing member

The invention claimed is:

1. A battery pack adapted for use with a hand-held, electric power tool, comprising:
a housing comprised of a rigid material, the housing containing a cooling air passage therein, which is in gaseous communication with the outside environment, and at least one isolated space, which is isolated from the cooling air passage,
at least one isolating wall disposed inside the housing so as to physically separate and isolate the cooling air passage from the at least one isolated space, and
a plurality of battery cells disposed within the housing such that an end portion thereof is disposed within the at least one isolated space and an intermediate portion thereof is disposed adjacent the cooling air passage, a plurality of first portions of the at least one isolating wall respectively contacting the plurality of battery cells,
wherein:
at least the plurality of first portions is comprised of a material that is more flexible and/or elastic than the rigid material of the housing,
the housing is comprised of an upper half and a lower half, and
a seal comprised of a material that is more flexible and/or elastic than the rigid material of the housing is disposed at least partially within the at least one isolated space and at least partially along a joint of the upper half and the lower half.

2. The battery pack according to claim 1, wherein the end portion of each battery cell comprises a metal battery cell electrode.

3. The battery pack according to claim 1, wherein:
a plurality of discrete first holes is defined in the at least one isolating wall,
the plurality of battery cells respectively extend through the plurality of discrete first holes; and
the first portions are perimetric edges of the first holes.

4. The battery pack according to claim 1, further comprising:
a circuit board electrically connected to the battery cells, the circuit board being disposed within the housing and extending through the at least one isolating wall such that an end portion of the circuit board is disposed within the at least one isolated space and an intermediate portion of the circuit board is disposed adjacent to the cooling air passage; and
at least one second portion of the at least one isolating wall contacting the circuit board is comprised of a material that is more flexible than the rigid material of the housing.

5. The battery pack according to claim 4, wherein at least one portion of a conductive material electrically connecting the circuit board with at least one battery cell is fixed to the end portion of the circuit board that is disposed in the at least one isolated space.

6. The battery pack according to claim 5, wherein the conductive material is a conductive wire, a conductive plate and/or a flexible board.

7. The battery pack according to claim 4, further comprising at least one contact terminal adapted to electrically contact a corresponding contact terminal of the electric power tool, the at least one contact terminal being disposed on the intermediate portion of the circuit board.

8. The battery pack according to claim 4, wherein:
a second hole is defined in the isolating wall,
the circuit board extends through the second hole, and
the at least one second portion is the perimetric edge of the second hole.

9. The battery pack according to claim 1, wherein the isolating wall comprises at least one resiliently-elastic portion adapted to expand and contract in response to increases and decreases, respectively, in pressure inside the at least one isolated space.

10. The battery pack according to claim 9, wherein the at least one resiliently-elastic portion is adapted to limit or eliminate changes in the pressure inside the at least one isolated space by changing the volume of the at least one isolated space in response to increases and decreases in the pressure inside the at least one isolated space.

11. The battery pack according to claim 9, wherein the at least one resiliently-elastic portion is thinner than other portions of the isolating wall.

12. The battery pack according to claim 9, wherein the at least one resiliently-elastic portion is recessed or protruding relative to other portions of the isolating wall.

13. The battery pack according to claim 1, wherein the seal and the at least one isolating wall are integrally formed with no seam therebetween.

14. The battery pack according to claim 1, wherein the entire isolating wall is comprised of a material that is more flexible and/or elastic than the rigid material of the housing.

15. The battery pack according to claim 1, wherein the material that is more flexible and/or elastic than the rigid material of the housing comprises natural rubber, synthetic rubber, a rubber material and/or an elastomer.

16. The battery pack according to claim 1, wherein the material of at least the plurality of first portions and/or the material of the at least one second portion exhibit(s) a hardness between 70-90 on a durometer scale type A.

17. The battery pack according to claim 16, wherein the at least one isolating wall consists entirely of a material that exhibits a hardness between 70-90 on the durometer scale type A.

18. The battery pack according to claim 1, wherein the rigid material of the housing exhibits a Young's modulus in the range of 1.0-3.0 GPa.

19. A battery pack adapted for use with a hand-held, electric power tool, comprising:
- a housing comprised of a rigid material, the housing containing a cooling air passage therein, which is in gaseous communication with the outside environment, and at least one isolated space, which is isolated from the cooling air passage;
- at least one isolating wall disposed inside the housing so as to physically separate and isolate the cooling air passage from the at least one isolated space; and
- a circuit board disposed within the housing and extending through the at least one isolating wall such that an end portion of the circuit board is disposed within the at least one isolated space and an intermediate portion of the circuit board is disposed adjacent to the cooling air passage, wherein:
- at least one second portion of the at least one isolating wall contacting the circuit board is comprised of a material that is more flexible and/or elastic than the rigid material of the housing.

20. The battery pack according to claim 19, wherein at least one portion of a conductive material electrically connecting the circuit board with at least one battery cell is fixed to the end portion of the circuit board that is disposed in the at least one isolated space.

* * * * *